United States Patent [19]

Hubbard et al.

[11] 3,992,858

[45] Nov. 23, 1976

[54] HYDRAULIC SYSTEM FOR CONTROLLING A GANG OF LAWN MOWERS

[75] Inventors: Glenn Richard Hubbard; Harold John Jacoby; Frank Allen Ecker, all of Racine; Donald Gene Haffner; Anthony Joseph Saiia, both of Milwaukee, all of Wis.

[73] Assignee: Jacobsen Manufacturing Company, Racine, Wis.

[22] Filed: Dec. 1, 1975

[21] Appl. No.: 636,697

[52] U.S. Cl. ..................................... 56/7; 56/10.9; 56/11.9
[51] Int. Cl.² ........................................ A01D 35/24
[58] Field of Search .................. 56/7, 6, 13.6, 11.9, 56/10.9, 15.9, 16.2

[56] References Cited
UNITED STATES PATENTS

| | | | |
|---|---|---|---|
| 3,563,011 | 2/1971 | Bramley et al. | 56/7 |
| 3,918,240 | 11/1975 | Haffner et al. | 56/7 |

*Primary Examiner*—J.N. Eskovitz
*Attorney, Agent, or Firm*—Arthur J. Hansmann

[57] ABSTRACT

A hydraulic system for controlling a gang of lawn mowers including a hydraulic pump and a multi-section valve and hydraulic motors driving the mowers. Hydraulic cylinders are also included in the system, for raising and lowering the mowers, and a check valve is connected with the cylinders for controlling the lowering of the mowers. The main valve is arranged with a plurality of spools which control the aforementioned functions and with the spools being set by means of a single handle so that the operator can perform the aforementioned functions through maneuvering the single handle for each set of hydraulic motors and cylinders. A hydraulic flow restrictor is included in the system for reversing the motors at a speed slower than the forward motor speed, for a slower reverse rotation of the mowers, such as for back-lapping of the mowers.

16 Claims, 2 Drawing Figures

HYDRAULIC SYSTEM FOR CONTROLLING A GANG OF LAWN MOWERS

This invention relates to a hydraulic system for controlling a gang of lawn mowers, and, more particularly, it relates to and includes a hydraulic system having a hydraulic pump and a valve and a plurality of lawn mowers which are under the influence of the hydraulic system for both the powering of the mowers in grass cutting and raising and lowering of the mowers.

BACKGROUND OF THE INVENTION

The prior art is already aware of various hydraulic systems which are utilized for powering lawn mowers, and for raising and lowering the mowers under the influence of hydraulic pressure. That is, the prior art is aware of mowing machines which include a tractor unit whereon the mowers are supported for transport over the ground, and the tractor includes a prime mover and a hydraulic system for powering the mowers in the cutting action and in raising and lowering the mowers. Examples of the prior art are found in U.S. Pat. Nos. 3,511,034 and 3,563,011 and in U.S. patent application Ser. No. 506,261 filed Sept. 16, 1974, and now U.S. Pat. No. 3,918,240.

The prior arrangements of gang mowing machines, such as those cited above, normally require a complexity of a hydraulic system wherein one section of the system is utilized for controlling the rotation or powering of the grass cutter itself, and another section of the system is utilized for raising and lowering the mowers relative to the supporting tractor. That is, the prior art requires that there be two branches of a hydraulic system and that there be separate control handles and the like for each of the two branches. In that arrangement, the operator will maneuver one handle for powering the grass cutter and he will maneuver another handle for raising and lowering the mowers between their normal transport position and their ground engaging or mowing position. Accordingly, the hydraulic systems of the prior art are distinct from the one disclosed herein, and it is a general object of this invention to provide a hydraulic system wherein the arrangement is of a compact and reliable system, including the fact that the operator needs to maneuver only one handle for controlling a corresponding hydraulic motor in driving the mower and for raising and lowering that mower. In accomplishing these objectives, the present invention provides a main hydraulic valve which has a plurality of sections joined in a single valve unit, and with each section having its own handle conveniently located to the operator, for the purpose mentioned above. Still further, the present invention accomplishes the aforementioned objectives and it does so by providing a valve unit which has a total number of sections which are actually two less than the total number of mowers controlled by the sections, and this is possible in that the arrangement is such that one valve section controls three of the mowers, namely, the three center mowers in the gang of mowers.

Still another object of this invention is to provide a hydraulic system for a gang lawn mower wherein the mowers may be raised and lowered but the lowering action can take place only when the system is operating, and thus there is an element of safety and the mowers can be retained in the raised position even though the system is not active.

Another object and advantage of this invention is to provide a hydraulic system for controlling a gang of lawn mowers wherein the system includes apparatus for reversing the direction of rotation of the mowers, such that, in reel type mowers for instance, the mowers can be relieved of debris and they can be sharpened by back-lapping against their own knife bed, in the reverse rotation.

Other objects and advantages will become apparent upon reading the following description in light of the accompanying drawings.

DETAILED DESCRIPTION OF THE PREFERRED EMBODIMENTS

Figure 1:
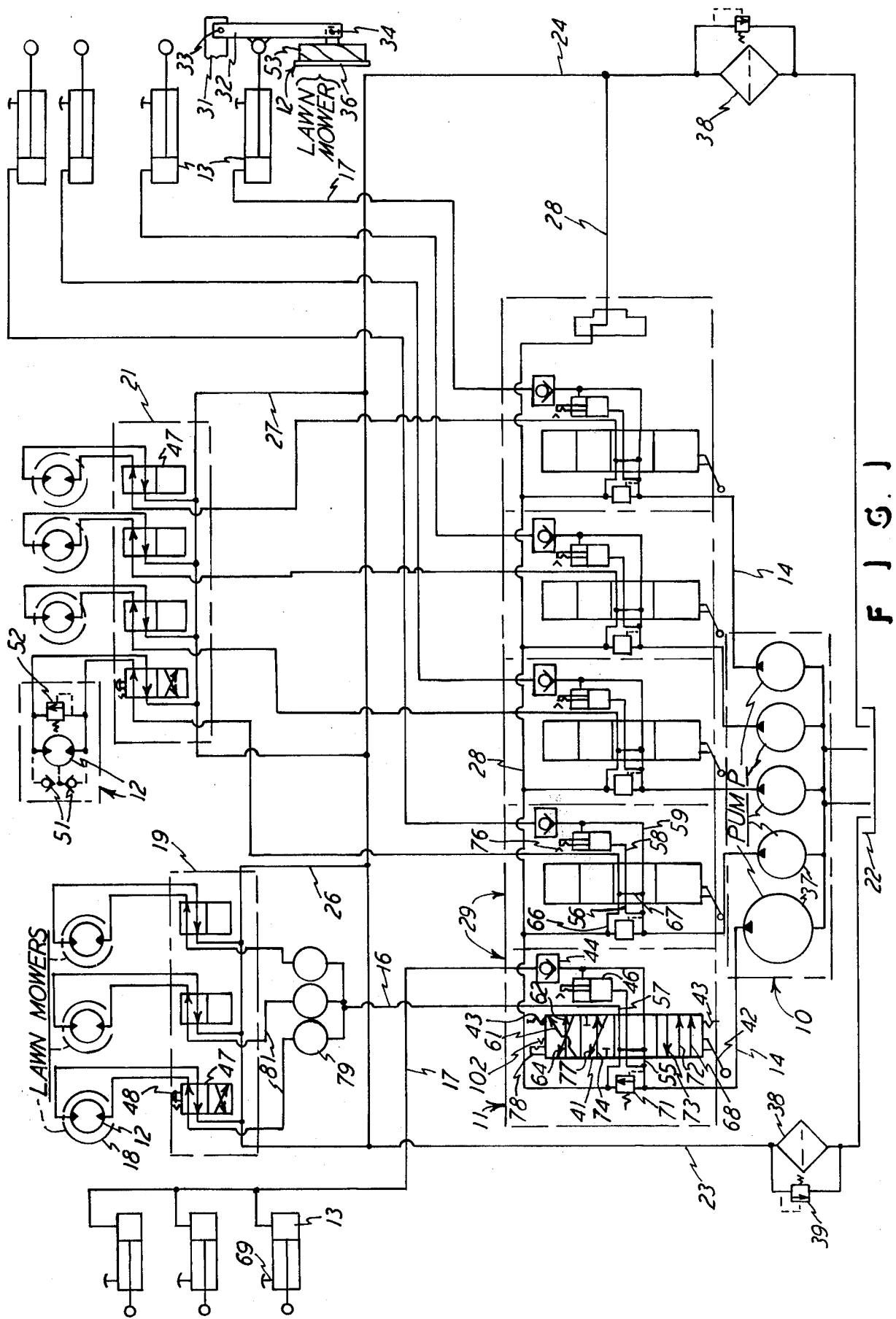
FIG. 1 is a diagrammatic view of the apparatus and the hydraulic circuit utilized in this invention.

FIG. 1 generally shows the hydraulic system to include the hydraulic pump unit 10 and the hydraulic valve unit 11 and the hydraulic motors 12 and the hydraulic cylinders 13. The drawings also show that the elements mentioned herein are connected, in conventional ways, by means of hydraulic hoses or lines, such as the lines 14 between the pump unit 10 and the main valve unit 11, and the lines 16 and 17 between the valve unit 11 and the motors 12 and the cylinders 13, respectively. The overall system also includes the seven lawn mowers designated 18 which are suitably operatively associated with and driven by the respective hydraulic motors 12, such as shown and indicated in U.S. Pat. No. 3,511,034, for instance. Reversing valve units 19 and 21 are also shown in the system interposed between the main valve 11 and the respective motor units 12. Further, a hydraulic reservoir 22 is shown in the system, and hydraulic return lines 23 and 24 are shown connected to the valves 19 and 21, such as thru the lines 26 and 27, respectively, and also the valve 11 is connected to the return line 24, such as thru the hydraulic line 28.

Other elements and hydraulic lines of the hydraulic system shown in FIG. 1 but which are not specifically referred to will be readily understood by one of ordinary skill in the art and therefore may not have been referred to and might not be further described herein.

The pump unit 10 is shown to include the five sections indicated and labeled "pump" and each of these sections individually connects, by the lines 14, to five corresponding sections in the valve 11, and these sections are designated 29. It will also be noticed, in the arrangement shown in FIG. 1, that there are seven mowers 18, and these are of the conventional reel type and they are suitably supported on a tractor or the like, such as shown in U.S. Pat. No. 3,511,034 and in U.S. Pat. No. 3,429,109 and U.S. Pat. No. 3,808,778, the disclosures of which are incorporated herein. Also, FIG. 1 shows a fragment of a tractor frame 31 having the mower support arm 32 pivoted thereon at a pivot point designated 33, and the mower 12 is connected to the extending end of the arm 32 at the connection point designated 34, and the mower has a conventional bed knife 36, such that the arrangement is conventional and thus apparent and fully disclosed to one of ordinary skill in the art and is like that shown in the referenced patents, for instance.

Thus the pump unit 10 and the valve unit 11 have the multisections respectively designated 37 and 29, and the sections are separately and respectively hydraulically connected together by the lines 14, as shown. Thus each respective section of the pump unit 10 supplies a respective section of the valve unit 11, and, in turn, the respective sections of the valve unit 11 are hydraulically connected to respective mowers 12 and hydraulic cylinders 13, all as shown in FIGS. 1 and 2.

The valve unit 11 further includes the common hydraulic return line 28 which connects to each of the valve sections 29, as shown, and the return lines 23 and 24 each have a hydraulic filter member 38 connected therein and being of a conventional arrangement and including a bypass relief valve 39.

Each of the main valve sections 29 has a valve spool 41 shiftably disposed in each section 29, and a handle 42 is available to the operator for controlling the shifted position of each spool 41, and compression spring return members 43 are at each end of the spools 41 for effecting centering or neutral positioning of the spool 41 when the operator releases the handle 42, and this neutral position is that which is shown in FIG. 1. It will be further noted that there is a check valve 44 and a hydraulic poppet valve 46, both of which are connected with respective outlets or passageways of the valve section 29, depending upon the setting of the spool 41.

Figure 2:
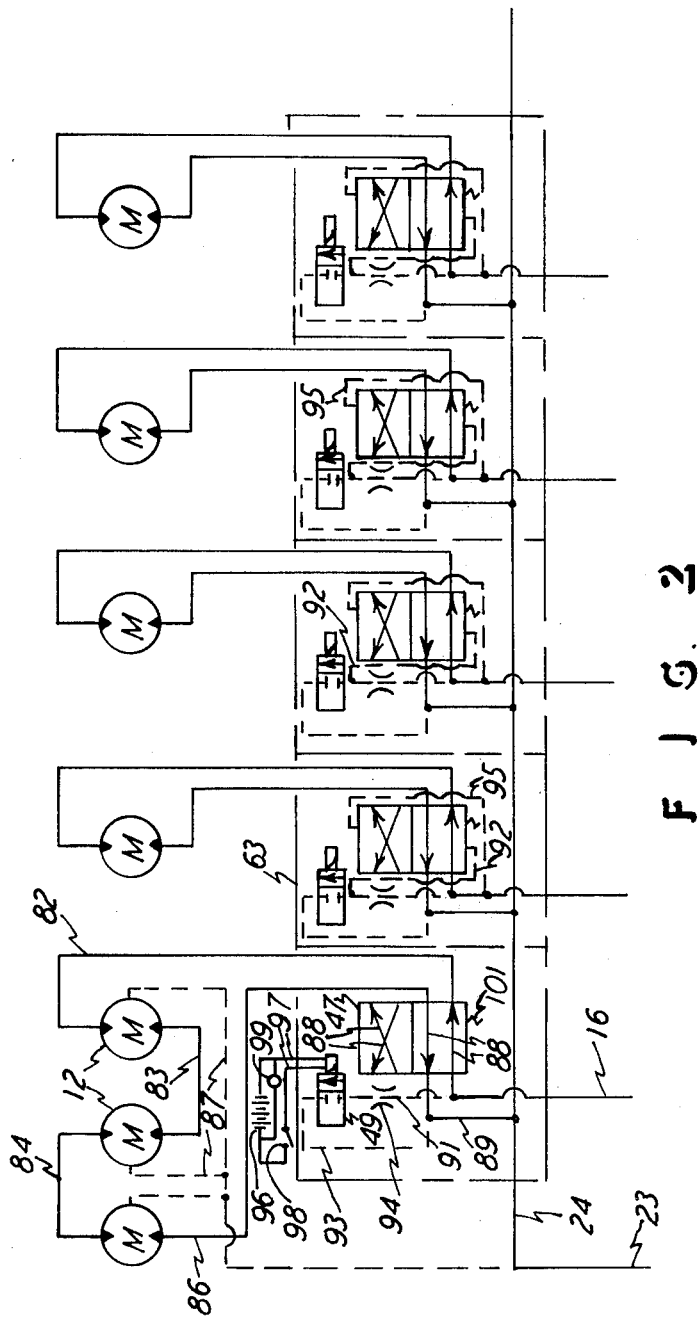
FIG. 2 is a diagrammatic view of a modified form of the apparatus and the hydraulic system shown in part of FIG. 1.

The reversing valve unit 19 and the unit 21 are shown to include spools designated 47, and these spools are shiftable in their respective valve units, and FIG. 1 shows a handle 48, for manual shifting of the spool 47, and FIG. 2 shows a solenoid valve member 49, for apparatus shifting of the spools 47 in the FIG. 2 embodiment. Thus, the reversing valve units 19 and 21 show a total of seven spools 47, and FIG. 1 also shows a total of seven lawn mowers 12, and thus this is a seven gang unit shown, but it may also be a five gang unit or an eleven gang unit or any conventionally desirable number, again as shown in the aforesaid cited patents. It will be further noted that there are only five pump sections 37 and only five main valve sections 29, and thus those sections are two less in total number compared to the total number of mowers 18, and that is also two less than the total number of motors 12, and the arrangement is true whether there be a five gang, seven gang, nine gang, eleven gang, or any other arrangement. That is, there can be two fewer sections 29 of the main valve 11, compared to the total odd number of motors 12, all because of the invention and arrangement described herein. It will therefore be noticed that the section 29 to the far left, as viewed in FIG. 1, is controlling and is hydraulically connected with the three motors 12 and the three cylinders 13, both groups of which are shown to the upper left in FIG. 1, and these are the center-mounted mowers on the mowing machine and they are therefore also the center-mounted or arranged cylinders 13 mechanically connected with the center mowers mentioned. Accordingly, the valve unit 19 controls the reversing action of the center-mounted mowers 18, as described above.

Each hydraulic motor unit 12 is further shown in the top of FIG. 1 to include the two hydraulic check valves 51 and the hydraulic pressure relief valve 52, arranged in the hydraulic system shown, and thus any excessive resistance or overload on any of the motors 12 will cause the relief valve 52 to shift to an open or bypass position and thus return the incoming flow to the unit 21 and back to the reservoir 22. Also, the check valves 51 permit the arrangement of the motors 12 which can be bidirectional or driven in the forward cutting direction as well as the reverse direction which is utilized for back-lapping or rotation of the mower reel 53, as seen to the right in FIG. 1, against the bed knife 36, for relieving debris or for sharpening the blades of the reel 53 against the bed knife 36.

FIG. 1 further shows that, relative to spools 41, valve sections 29 have two hydraulic flow inlets 55 and 56 and three hydraulic flow outlets 57, 58, and 59. Each spool 41 has the passageways and ports indicated on the spool on the left in FIG. 1. When the spool 41 is shifted downwardly as seen in FIG. 1, the spool passageways 61 and 62 respectively align with the valve inlets 55 and 56 and outlets 57 and 58, and thus the motors 12 are powered by the passage of hydraulic fluid from the inlet 56 and through the spool 41 and into the line 16 and through the valve units 19 and 21. With the spool 41 in the motor driving position just described, the motors 12 can be reversed by shifting of the spools 47 in the reversing valve units 19 and 21, and this is also true of the spools 47 in the FIG. 2 embodiment, which are shown to be in a valve unit designated 63. In that lowered position of the spool 41 as just described, each spool 41 also presents a passageway 64 which permits flow from the outlet 59 and back to a return flow line 66 which connects with the return line 28, as shown.

Of course in the position shown in FIG. 1, the spool 41 is in the neutral position such that flow going from the pump unit 10 and into the inlet 55 will pass to the outlet line 66 by means of a cross-over line 67 in the spool 41, as shown.

Next, to raise the mowers 18 to the transport position, the spools 41 are shifted upwardly to where the spool passageway 68 aligns with the inlet 55 and the valve outlet 59 to pass the hydraulic pressure to the check valve 44 and open same so that the pressure goes to the cylinder lines 17 and causes the cylinder assemblies 13 to extend, as the fluid pressure enters the head end of the single acting or one-way acting cylinders, as shown herein. Of course each cylinder 13 is provided with a vent member at 69 which permits the assemblies 13 to breathe, in a conventional arrangement. Of course the check valves 44 prevent back flow or loss of pressure in the lines 17, and thus the mowers 18 can be held in the raised position by the assemblies 13, once that raised position is achieved. Further, once the cylinders 13 reach their maximum pressure, which is commonly at the end of their lifting action or stroke, then the pressure in the lines 17 and 59 will be effective on the pressure relief valve 71 which will then open and permit the excessive hydraulic pressure to pass to the return line 28. In the mower raising action, the full output of the pump unit 10 is available because of the spool passageway 72 which aligns with the valve outlet 58 when the spool 41 is lowered to the lifting mode, as described, and also the spool 41 has a return passageway 73 which aligns with the outlet 57 to permit return flow to the lines 66 and 28 in the lowering mode.

Finally, when it is desired to lower the mowers, the spools 41 are shifted downwardly, as viewed in FIG. 1, and this places the spool passageway 74 in alignment with the outlet 58 which thus pressurizes the poppet valve 46 which is operatively associated with the check valve 44, in any conventional arrangement and in any way which will be readily known and understood by one of ordinary skilled in the art. Thus, the poppet valve 46 is actuated and opens the check valve 44 and that permits the return flow or relief of pressure in the line 17, and thereby the cylinders 13 will retract, under the weight of the elevated mowers 18, and the mowers will then be lowered to the ground. Further, the poppets 46 have detents 76, of a conventional arrangement, which engage the moving arm or unit of the poppet 46, as indicated in the drawing, and thus hold the poppet 46 in the open position and thereby hold the check valves 44 in the open position, all for the lowering of the mowers 18 and for permitting the mowers to float or move up and down when in the mowing position on the ground. The spools 41 also have a return line passageway 77 which permits flow from the outlet 59 and back to the return line 66 when the spool is in the mower lowering position just described.

Also, each spool 41 may be retained in a set position, such as the lowered position for powering the motors 18, and this may be by means of the arm and detent arrangement designated 78 which is of a conventional arrangement and is releasable so that, upon release of the handle 42, the spool will automatically return to the centered and neutral position shown.

FIG. 1 further shows that the three center mowers which were described are hydraulically connected with a proportionator designated 79, and this is a conventional hydraulic unit which evenly divides the flow from the incoming line 16 and to the three lines designated 81 and thus each of the three center mowers 18 is evenly and uniformly powered, since these three mowers are always on the ground or raised in unison. Likewise, the corresponding, three cylinder units 13 for the center mowers 18 are connected to the one line 17, for the uniformity mentioned.

FIG. 2 shows an arrangement whereby the proportionator 79 can be eliminated, but the three center mowers 18 can still be uniformly powered, and this is arranged by putting the three center mowers in a hydraulic series connection by means of an incoming hydraulic line 82 and interconnecting lines 83 and 84 and a return line 86. The dotted lines 87 connected with the three motors 12 show the motor leakage drain line to the common return line 24. Also, with the arrangement of FIG. 2, the motors 12 therein can be reversed in their direction of rotation, as described above and as hereinafter described.

FIG. 2 shows a somewhat different arrangement of the system, and, as mentioned above, the three center motors 12 and their corresponding mowers 18 are connected in a hydraulic series connection shown. The motors are actually preferably of a larger displacement so that they produce the same torque output when connected in series as shown. The arrangement eliminates two of the valve sections 47 and it eliminates the proportionator 79.

The reversing valves 47 show their four spool passageways 88 in each spool 47, and these passageways align with the valve outlets to drive the motors 12 in the forward direction, such as shown in the spool positions in FIG. 2, with the spools under the influence of springs 101. Also, when the spools 47 are shifted downwardly, then the shown diagrammatically crossed passageways 88 will respectively align with the inlet line 16 and the outlet line 89 which connects with the return lines 26 and 24, as seen in FIG. 1.

FIG. 2 further shows that the reversing valves 47 may be controlled by the solenoid valves 49, rather than by being manually controlled by the handle 48, as indicatd in FIG. 1. Thus, the valve 49 is hydraulically connected to the line 16 through a line 91 which is connected through a line 92 to one end of the reversing valve spool 47, and a line 95 connects between line 16 and the other end of spool 47, on all the spools 47. Another hydraulic line 93 connects from the other side of the valve 49 and to the return line 89. When the valve 49 is shifted to where the arrowhead passageway permits flow through the valve 49 and into the line 93, the flow is then returned to the tank through the return line 89 and it also passes through a flow restrictor 94 and is then directd to the end of the spool 47 through the line 92, and because of reduced fluid pressure in line 92 compared to line 95, spool 47 is shifted downwardly to the reversing position described. Such downward shifting of the spool 47 causes the reverse rotation of the motors 12. Some of the incoming fluid is directed through the spool 47, when the latter is in the reverse position described, and, with that arrangement, the motors 12 are operated at a slower speed in the reverse direction, since only some of the incoming fluid in the line 16 is directed through the spool 47 and to the motors 12 because of the restrictor 94.

The valve 49 may be a solenoid type of valve, and therefore a source of electric power, such as the battery 96 is shown in FIG. 2 and electric wires 97 connect with the solenoid portion of the valve 49 and with the battery 96, and there is also a switch 98 in the electric circuit. Thus, the switch is available to the operator who can close the switch and thereby energize the conventional solenoid portion of the valve 49 and thereby cause the valve to shift to the open position to create flow in the line 92 and thereby shift the reversing valve 47, all as described above. Also, an electric indicator lamp 99 is shown in the electric circuit and will be energized and therefore visible when the switch 98 is closed, and the operator will then know when the motors 12 are running in the reverse direction for the back-lapping or other purpose mentioned above. Of course when the switch 98 is open, or when there is no fluid flowing in the system, such as when the system is not operating, then the compression spring 101 will cause the spool 47 to shift to the upward position which is shown in FIG. 2, and that of course is the forward direction of rotation for the motors 12 and thus that mode is automatically achieved when the switch 98 is open. With the slower speed of reverse direction of rotation for the motors 12, the tractor engine and other powered elements need not be operated at slower speeds, such as engine idle speeds, and there is not a loss of power or inefficiency in the system since the motors are then reversed at their optimum speed.

With regard to the spools 41 in FIG. 1, when they are moved downwardly, then the handle or control member 78 is under the control of the detent arrangement at 102, and the spool is then set and remains in the running position. Also, in that running position, the spool passageway 62 aligns with the valve outlet 58 to control the poppet 46 and thus retain the check valve 44 in the released or open position to have the mowers 18 float in the mowing position, since there is then no fluid pressure controlling the lift cylinders 13.

Accordingly, with this invention, the operator has complete control of all of the functions of the motors 12 and the cylinders 13, and the handles described in connection with the valve spools disclosed herein, and also the electric switch 98, can all be adjacent the operator seat on a tractor or the like, in any conventional arrangement but having all of the controls available to the operator. Still further, as described herein, the single handle or control 42 on the spool 41 will permit the operator to have the control for raising and lowering the mowers and also for running the mowers in the forward direction. Therefore, a compact but yet simplified hydraulic system is provided for complete control of a gang of mowers having a plurality of lawn mowers from say three mowers to eleven mowers, for instance.

What is claimed is:

1. A hydraulic system for controlling a gang of lawn mowers, comprising a hydraulic pump, a single-bodied hydraulic valve having a plurality of sections with each of said sections having a separate hydraulic inlet hydraulically connected with said pump, each of said valve sections having a first and a second hydraulic flow outlet, a plurality of lawn mowers, a plurality of hydraulic motors respectively hydraulically connected with said first valve outlets and operatively associated with said mowers for driving said mowers, a plurality of hydraulic cylinders respectively hydraulically connected with said second valve outlets and operatively associated with said mowers for raising and lowering said mowers, a valve spool shiftably disposed in each of said sections and with each of said spools having two hydraulic flow passageways respectively alignable with the first and second said valve outlets for passing hydraulic fluid to said valve outlets, and a handle operatively connected with each of said spools for selective shifting of said spools and consequent passing of hydraulic fluid to either of the two said valve outlets, for either powering said mowers or raising and lowering said mowers.

2. The hydraulic system for controlling a gang of lawn mowers as claimed in claim 1, wherein said valve has an additional single outlet in hydraulic flow communication with all of said sections for return of hydraulic fluid to said pump.

3. The hydraulic system for controlling a gang of lawn mowers as claimed in claim 1, wherein there is a total number of five said motors, and the total number of said valve sections is two less than that of said motors, and including hydraulic connections extending between one of said sections and three of said motors.

4. The hydraulic system for controlling a gang of lawn mowers as claimed in claim 1, wherein said hydraulic cylinders are single acting cylinders, and including a hydraulic check valve hydraulically connected with and between each said second valve outlet and the respective said hydraulic cylinder, for resisting return flow of fluid from said hydraulic cylinders and thereby control the lowering of said mowers.

5. The hydraulic system for controlling a gang of lawn mowers as claimed in claim 4, wherein each of said valve sections has a third hydraulic flow outlet, and including a hydraulic pilot line hydraulically connected between said third hydraulic flow outlet and said check valve for opening said check valve by applying hydraulic pressure thereto.

6. The hydraulic system for controlling a gang of lawn mowers as claimed in claim 5, including a poppet valve hydraulically connected in said pilot line and operatively associated with said check valve for holding said check valve in an open position.

7. The hydraulic system for controlling a gang of lawn mowers as claimed in claim 1, wherein the total number of said motors and said mowers is at least five of each, and said pump is a single bodied unit having a number of pumping sections which are a total of two less than said total number of said motors.

8. The hydraulic system for controlling a gang of lawn mowers as claimed in claim 1, including a hydraulic reversing valve hydraulically connected between and with said first valve outlets and said motors for reversing the direction of rotation of said mowers.

9. The hydraulic system for controlling a gang of lawn mowers as claimed in claim 8, wherein said mowers are the conventional reel type with each including a rotatable grass cutting reel and a bed knife, and said motors being operatively associated with said reels for rotation of said reels in both directions of rotation and with one direction being a grass cutting direction and the other direction being a back-lapping of said reel over said bed knife for sharpening of said reel.

10. The hydraulic system for controlling a gang of lawn mowers as claimed in claim 9, including a hydraulic restrictor hydraulically connected with said reversing valve for reducing hydraulic flow to said motors when said reversing valve is in its reverse mode, to thereby cause said reels to rotate slower in the back-lapping direction compared to the grass cutting direction.

11. The hydraulic system for controlling a gang of lawn mowers as claimed in claim 8, including an electrically operative system operatively associated with said reversing valve for controlling the latter, and said electrically operative system including a battery and an electric switch for energizing said electrically operative system.

12. The hyraulic system for controlling a gang of lawn mowers as claimed in claim 11, wherein said electrically operative system includes an electric solenoid and a hydraulic valve for controlling said reversing valve.

13. The hydraulic system for controlling a gang of lawn mowers as claimed in claim 12, including an electric indicator lamp electrically connected with said switch for indicating when said electrically operative system is being energized.

14. The hydraulic system for controlling a gang of lawn mowers as claimed in claim 1, including a pressure relief valve hydraulically connected with each of said second valve outlets for limiting hydraulic flow to said cylinders, and including a hydraulic return line hydraulically connected between said relief valve and said pump for return flow to said pump.

15. The hydraulic system for controlling a gang of lawn mowers as claimed in claim 14, including a poppet valve and a check valve with both hydraulically connected between said pressure relief valve and said cylinder and arranged to be responsive to the hydraulic pressure at said relief valve for hydraulically opening said poppet valve, and said poppet valve having means for holding itself in the open position independent of hydraulic pressure thereat.

16. The hydraulic system for controlling a gang of lawn mowers as claimed in claim 1, wherein there is one said motor for each said mower and the total number of said motors and said mowers is an uneven number of at least three of each, and said pump is a single bodied unit having a total number of pumping sections which is two less than said total number of said motors.

\* \* \* \* \*